United States Patent

[11] 3,630,742

| [72] | Inventors | Irvin H. Crawford<br>Spencerport;<br>James L. Kane, Rochester, both of N.Y. |
|---|---|---|
| [21] | Appl. No. | 866,983 |
| [22] | Filed | Oct. 16, 1969 |
| [45] | Patented | Dec. 28, 1971 |
| [73] | Assignee | Eastman Kodak Company<br>Rochester, N.Y. |

[54] POLYMERIC PHOTOGRAPHIC SUPPORTS
16 Claims, 1 Drawing Fig.

[52] U.S. Cl. ................................................ 96/87 R,
96/87 A, 96/114.4, 117/47 A, 117/62, 117/93.1
CD, 117/138.8 F
[51] Int. Cl. .......................................... G03c 1/82,
G03c 1/78
[50] Field of Search ............................................ 96/87, 87
A, 114.4; 117/138.8 F, 62, 47 A, 93.1 CD;
204/165

[56] References Cited
UNITED STATES PATENTS

| 3,062,649 | 11/1962 | Salminen et al. | 96/87 |
| 3,072,483 | 1/1963 | Trevoy et al. | 96/87 |
| 3,081,214 | 3/1963 | Strome | 204/165 X |
| 3,300,313 | 1/1967 | Vrancken et al. | 96/87 |
| 3,411,908 | 11/1968 | Cranford et al. | 96/87 X |
| 3,437,484 | 4/1969 | Nadeau | 96/87 |
| 3,501,301 | 3/1970 | Nadeau et al. | 96/87 |

FOREIGN PATENTS

| 750,323 | 1/1967 | Canada | 96/87 |
| 794,658 | 5/1958 | Great Britain | 96/87 |

Primary Examiner—John T. Goolkasian
Assistant Examiner—Joseph C. Gil
Attorneys—Walter O. Hodsdon and Wendell H. McDowell ABSTRACT: A photographic element having a translucent support is prepared by activating each surface of a sheet of polystyrene or polyester with corona discharge, polyethylene is extruded onto each activated surface, one polyethylene surface is then activated with corona discharge, a gelatin layer is coated upon the activated polyethylene surface and an antistatic layer is coated upon the gelatin layer, the other polyethylene surface is activated by corona discharge and a photosensitive layer such as gelatin-silver halide emulsion layer is coated on the polyethylene surface. Substantial improvement in antistatic properties and curl is obtained compared to coating a single gelatin-containing antistatic layer on the polyethylene surface.

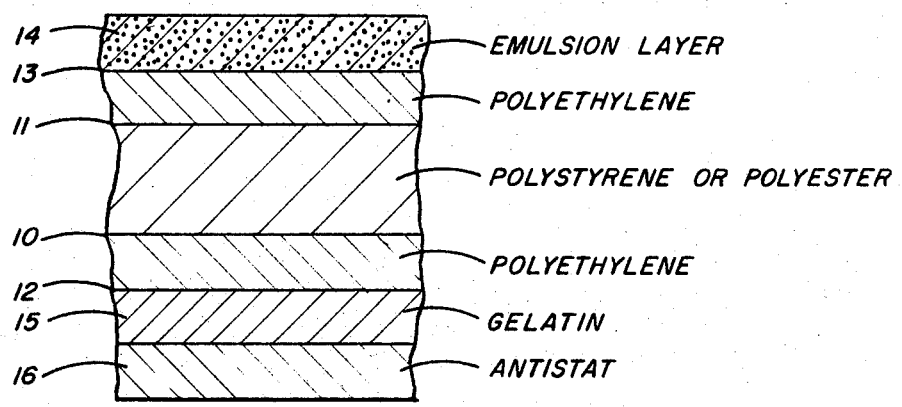
IRVIN H. CRAWFORD
JAMES L. KANE
INVENTORS
ATTORNEY & AGENT

POLYMERIC PHOTOGRAPHIC SUPPORTS

This invention relates to a process for the preparation of photographic elements having a polymeric support provided with anticurl and antistatic layers.

Photographic films having a photosensitive layer coated upon a transparent support such as cellulose ester or polyester supports are well known in the art. The films are useful in the amateur and professional fields of photography for the production of line, half-tone or continuous tone images of the highest quality.

In industrial photography, in areas where the highest quality of image reproduction is not necessary, there has long been a need for a sensitive element of good dimensional stability to heat and moisture which can be made more cheaply than by the usual film-casting method where a solvent dope of the polymer is coated on a surface and the solvent slowly evaporated to produce a transparent uniform film base. It is not necessary that the support be fully transparent, nd translucent supports are acceptable. For this purpose paper has been impregnated with polymers to transparentize the paper with little success since either tacky products resulted, the polymers migrated in the paper or the sensitive layers coated thereon would not satisfactorily adhere. Melt-coated polymers did not have the desired properties, being either too soft or too brittle, or again, the sensitive layers would not readily adhere. Glassine paper melt-coated with polymers is useful but glassine paper is difficult to handle. In particular, several plies of glassine paper are usually required, as described in U.S. Pat. No. 3,260,602, to obtain the desired physical properties such as water resistance and a flat sheet. However, considerable variation in these properties results even with the most careful control during manufacture. Polystyrene sheeting (oriented) has excellent transparency and little curl but is lacking in tear strength and scratches easily. Moreover, hydrophilic photographic layers do not adhere readily to the polystyrene surface even by use of a subbing layer or by activation of the surface with corona discharge. Similarly, other extruded polymers such as polyesters lack the required properties.

We have discovered a simple process for preparing polymeric photographic supports using the low cost commercially available synthetic polymers, polystyrene, polyesters and polyolefins and as a result, production costs are substantially reduced. The process avoids the use of solvents either for preparing the support or for the adhesion of photosensitive layers such as gelatin-silver halide emulsions to the support. Neither polymer alone in sheet form possesses the desired properties but when the polymers are used in combination in the process of the invention, satisfactory physical properties including good tear strength and abrasion resistance are obtained well in excess of that expected. According to the invention, oriented polystyrene or polyester sheeting is activated by corona discharge on each surface and layers of polyethylene and then extruded onto the activated surfaces. The resultant sheet is translucent, flexible and has good dimensional stability. One of the polyethylene surfaces is then corona activated and photosensitive layer such as a gelatin-silver halide emulsion layer is coated on the surface. The polymer layers and the emulsion layer adhere well both dry and during processing in the usual photographic processing solutions. However, the sheet has a decided tendency to curl toward the emulsion surface which seriously limits its utility. Moreover, during handling of the sheet static charges accumulate which fog the light-sensitive emulsion layer. Accordingly, in a further embodiment of the invention a hydrophilic organic colloid layer, e.g. a gelatin layer and antistatic material, are coated on this polyethylene surface adequate to reduce static and substantially eliminate the curl propensity of the sheet. Unexpectedly, it was discovered that the lowest level of static and curl propensity is not readily obtainable if a single gelatin layer containing the antistatic material is coated upon the polyethylene surface. That is, apparently due to a coaction of the gelatin with the antistatic material, excessive amounts of gelatin are required to reduce curl and obtain optimum surface resistivity. For this reason, a preferred process of the invention includes the steps of corona activating the polystyrene or polyester surfaces, preferably immediately extruding polyethylene thereon, corona activating one polyethylene surface, coating the gelatin anticurl layer and then the antistatic layer, corona activating the other polyethylene surface and coating the light-sensitive layer thereon. The amount of gelatin used is about the same as present in the emulsion layer and about 10 to 50 percent less gelatin is needed compared to the mentioned process where a single layer of gelatin containing antistatic material is used. The product appears in cross section substantially as shown in the drawing. It is possible to coat the photosensitive layer before coating the gelatin and antistatic layers but is less preferred. In applying the gelatin and antistatic layers, optimum results are obtained by simultaneously coating these layers in that order on the polyethylene surface in the manner described in the examples below.

The accompanying drawing shows in greatly enlarged cross-sectional view the appearance of a representative sensitive element of the invention. As shown, the polymeric surfaces 10 and 11 are corona activated to adhere the extruded polyethylene layers, and the surfaces 12 and 13 of the polyethylene are corona activated to adhere the gelatin emulsion layer 14 and the gelatin anticurl backing layer 15. The antistatic layer 16 is coated over the gelatin backing layer.

The polystyrene and polyester sheetings are biaxially oriented, preferably having a thickness in the range of about 0.004–0.005 inch. The oriented sheeting is prepared by drafting and tentering a substantially thicker sheet in a well-known manner. Also, oriented polystyrene sheeting made by the well-known blown film process is useful. "Polystyrene" as used herein includes oriented polystyrene modified by a minor amount of another polymer such as butadiene (about 2 to 5 percent). The polyester sheeting is linear polyester well known in the art including, e.g. polyethylene terephthalate obtained, e.g. as described in U.S. Pat. No. 2,465,319, and polyesters derived from terephthalic acid and 1,4 -cyclohexanedimethanol as described in U.S. Pat. No. 2,901,466.

The polyolefins are extruded onto the polystyrene or polyester so as to obtain about 2 to 4 lbs./1,000 sq. ft. of surface. The polyolefins used in the process are the aliphatic polyolefins, polyethylene, polypropylene and copolymers of ethylene and propylene. Useful polyethylenes have a density range of about 0.910 to 0.980 g./cc., their viscosity measured by melt index (ASTM D–1238, condition "E") can be about 2.0 to 20.0, preferably 3.0 to 12.0 decigrams per minute and they can be about 40 to 90 percent crystalline. Useful polypropylenes have a density range of about 0.900 to 0.910, their viscosity measured by melt flow rate (ASTM D–1238, condition "L") can be about 10 to 90, decigrams per minute and they can be about 60 to 80 percent crystalline. The polyolefins are prepared by well-known methods of polymerization of ethylene and propylene using, for example, Zeigler catalyst. Blends of high-density polyolefins and low-density polyolefins (the latter originating from either initial polymerization of olefins to lower density, or by heat degradation of high-density polymer) can be employed. Other aliphatic polyolefins which are useful are the polyallomers, i.e. copolymers of ethylene and propylene prepared e.g. as described in the Hagemeyer U.S. Pat. applications Ser. Nos. 505,227 filed Oct. 26, 1965, 516, 783, and 516,677 filed Dec. 27, 1965.

The layer which is coated on the polyolefin surface for curl control, and is followed by the antistatic layer, contains approximately the same amount of gelatin or other hydrophilic organic colloid as is present in the photosensitive layer on the other side of the support. The amount of gelatin in the layer is, for example, about 3 to 6 grams per sq. meter when emulsions of average gelatin content are employed. As mentioned, and will be seen from the following examples, this amount of gelatin is about 10 to 50 percent less than needed when the antistat is present in the gelatin layer. The gelatin solution used for coating this layer should be substantially free of surfactants when coated simultaneously with the antistatic layer as described in the examples below.

The antistatic material coated as a separate layer over the curl control gelatin layer on the back of the polyolefin coated support, as in example 2 below, is preferably an ionic organic antistatic material. The preferred ionic organic antistats are the alkali metal salts of polymeric carboxylic acids. The sodium polyacrylates are especially useful, e.g., the sodium salts of polymerized acrylic acids and acrylic acid copolymers such as polymers of acrylic acid, methacrylic acid, ethacrylic acid, and the like. Particularly good results are obtained by the use of Daxad 30 which is a trade name for a sodium salt of polymethacrylic acid sold by the Dewey and Almy Chemical Co. Other commercially available products of this type which may be employed are Tamol 850 and Tamol 731 which are trade names for products sold by the Rohm and Haas Co. Many other alkali metal salts of polymeric carboxylic acids may also be utilized as the ionic organic antistatic agent, for example potassium polyacrylates, alkali metal salts of acrylic acid copolymers such as the sodium salt of an acrylic acid-methyl acrylate copolymer, and the like. The polymeric carboxylic acid salts can be coated at a coverage of about 1 to 3 grams per sq. meter. The alkali metal cellulose sulfates are also very useful as the ionic antistatic material, e.g. sodium cellulose sulfate. An additional advantage of these cellulosic antistatic materials resides in their ability to reduce tackiness of the antistatic layer.

It is advantageous to incorporate insoluble organic or inorganic particles into the antistatic layer, e.g. silica of about 4 micron size, to provide a surface receptive to writing materials and to obviate any tackiness of the antistatic layer. About 0.3 to 0.6 grams per sq. meter are useful.

When the antistatic material is to be incorporated into the curl control layer as in example 1 below, preferred antistatic materials are the arylsulfonic acid salts such as 2,7 - naphthalene disulfonic acid disodium salt. Somewhat more than 3 grams per sq. meter may be required to obtain maximum static protection.

The protection against static afforded by the mentioned antistatic coatings can be predicted by comparing the surface resistivity of the polyolefin surfaces before and after coating with the anticurl and antistat layers. Resistivity is determined herein by measuring surface conductivity in terms of surface resistivity at specific conditions of temperature and humidity, namely, at 75° F. and 42 percent relative humidity, between two electrode plates and calculating the surface resistivity according to the formula:

$$\text{Resistivity (ohms)} = \text{Resistance observed (ohms)} \times \frac{\text{Spacing between electrodes (cms.)}}{\text{Length of electrodes (cms.)}}$$

For further details of the above method for measuring surface resistivities, reference may be had to G. F. Nadeau et al. U.S. Pat. No. 2,801,191, issued July 30, 1957. It has been found in the present invention that if the resistivity measurement for the polymer surface after antistatic coating indicates a value of about 9.0 log ohms (as compared to a value of greater than about 16.0 log ohms on similar surfaces but without the benefit of the antistatic layer of this invention), then the preferred static protection is indicated.

The corona activation of the polymeric surfaces 10, 11, 12 and 13 can be carried out subjecting these surfaces to the action of corona discharge. The corona discharge applied to the polymer surfaces is supplied by well-known power sources. The spark-gap-type power source for the corona has current supplied to the electrodes by a spark-gap excited oscillator in a well-known manner. Variation in fundamental frequency of the corona is obtained by changing the primary power frequency of the oscillator in a range up to 10,000 or more cycles per second. As mentioned, a high-voltage corona is desirable, e.g. 25,000 to 50,000 peak volts or higher, to obtain adequate adhesion of the layers to the corona activated surface. Voltages of this range are adequate for corona activation of polymers at web speeds of about 100 or 1,000 feet per minute or higher.

The corona can be applied to the polymeric surface, for example, by means of several metal electrodes positioned close to the polymeric surface at a point where the polymeric surface is passing over a grounded metal roll coated with a dielectric metal such as a linear polyester. Similarly, a metal roller may be used to support the web with the other electrode array being in planatary disposition equidistant from the surface of the metal roller and each being coated with a dielectric, at least on the surface nearest the metal roller. The spacing of the electrodes to the polymer surface and ground roll should be adequate to produce the corona at the voltage used and yet allow for free passage of polymeric sheet through the activating zone. Corona supplied by AC current, or a combination of AC superimposed on DC can be used. However, there appears to be no advantage in using DC corona and, in fact, AC is preferred since the continuous wave AC corona requires much less power and is, thus, considerably cheaper to use.

After corona activation of the surfaces of the polyolefin layers for adhesion of layers 14 or 15, it may be advantageous to reduce the irregularity of the resulting electrostatic charge on the polyolefin surfaces and also substantially lower the level of the charge before coating layers 14 or 15. The processes of Kerr et al. U.S. Pat. application Ser. No. 728,641 filed May 13, 1968 can be used for this purpose. Thus, layers 14 and 15 can be expected to coat more uniformly.

The polyolefins are extruded onto the activated polystyrene surfaces at speeds of the order of about 200 to 1,000 f.p.m. and temperatures of about 580° to 650° F.

The following examples will serve to illustrate our invention.

EXAMPLE 1

A sheet of oriented polystyrene 0.005 inch thick is corona activated using 60 cycle spark-gap-type power source at about 50,000 peak voltages and 125 f.p.m. Immediately thereafter, about 3.0 lbs. polyethylene per 1,000 sq. ft. is extruded onto the activated surface. The polyethylene is low-density (0.92) polyethylene. The polyethylene surface is then activated with similar corona at a second station on the machine and the following aqueous solution coated on the activated polyethylene surface so as to obtain about 6.8 grams gelatin and 3.4 grams of the disulfonic acid antistatic material per sq. meter dry weight.

| Ingredient | Parts by weight (dry) |
|---|---|
| Gelatin | 133 |
| 2,7-naphthalene disulfonic acid, disodium salt | 67 |
| Dow 612[1] | 29.8 |
| Formaldehyde | 2.32 |
| Chromic chloride | 0.60 |
| Oleylmethyl taurine[2] | 1.5 |
| Sulfonated malachite green | 1.0 |

(1). Latex of a styrene-butadiene copolymer, 48% solids (2). Sodium N-methyl-N-oleoyl taurate These ingredients can be dispersed in about 1,500 parts of water for preparation of the coating solution. The other surface of the polystyrene is corona activated in the same manner at another station on the machine followed by extrusion of about 3.0 lbs. polyethylene per 1,000 sq. ft. The sheet is slightly translucent.

The other polyethylene surface is then corona activated and a conventional, high contrast gelatin-silver bromoiodide emulsion layer is coated upon the polyethylene surface at about the same speed. The gelatin coverage of the emulsion layer is approximately the same as the gelatin coverage of the antistatic layer. Handling of the sensitive element does not give rise to objectionable static discharges and the processed emulsion layer shows no static markings due to fogging. Cut sheets of the sensitive element showed acceptable curl. The polymer layers and the antistatic layer adhered firmly both dry and when wet with photographic processing solutions.

The surface resistivity of the polystyrene sheet coated with polyethylene is 16.0 log ohms and after coating with the antistatic layer is 11.0 log ohms tested at 42 percent relative humidity. If it is desired to reduce the surface resistivity from 11.0 to about 9 or 10 log ohms, it is necessary to use the two-coat process of the following example.

EXAMPLE 2

A polystyrene sheet is coated with polyethylene as described in example 1. After corona activation, one polyethylene surface is coated simultaneously in order with the following solutions:

| Gelatin layer | Parts by weight |
| --- | --- |
| Gelatin | 8.5 |
| Formaldehyde (40%) | 0.15 |
| Water | 91.35 |

| Antistat layer | Parts by weight |
| --- | --- |
| Daxad 30 | 8.0 |
| Triton X200(3) | 0.2 |
| Silica(1) | 0.3 |
| Polymer dispersion(2) | 1.1 |
| Water | 85.4 |

(1). 4-micron size (2). Aqueous dispersion of sodium polyacrylic acid, 28% solids. Used as thickener to facilitate drying and can be replaced with other thickener such as cellulose ethyl ether.

(3). Alkali metal alkylaryl polyether sulfonate sold by the Rohm and Haas Co.

A dual coating hopper is used in the manner described in U.S. Pat. No. 2,671,791 to coat the two layers simultaneously, the gelatin anticurl layer being coated at about 3.5 grams per sq. meter dry weight and the silica-containing antistatic layer at about 1.0 to 2.5 grams per sq. meter dry weight. A high contrast gelatin-silver halide emulsion layer is coated on the other activated polyethylene surface under the conditions described in example 1, the gelatin coverage being approximately the same as the gelatin anticurl layer.

The surface resistivity of the polyethylene coated polystyrene sheet curl. greater than 16.0 log ohms before coating the gelatin and antistatic layers, and 9.0 log ohms measured at 42 percent relative humidity after application of the gelatin and antistatic layers. No static problem is noted. Thus, compared to example 1, approximately 30 percent less antistatic material is required to obtain a reduction of resistivity of from 16.0 to 9.0 log ohms. Moreover, about 50 percent less gelatin is required to obviate curl. The wet and dry adhesion of all layers is good. Cut sheets of the sensitized material show no visible curl. When half-tone images are prepared by exposure and development in the usual manner, substantially better definition is obtained compared to the use of a similar element described in U.S. Pat. No. 3,260,602 comprising alternate layers of polyethylene and glassine paper. Also, the production cost is substantially less.

EXAMPLE 3

The process of example 2 is carried out except using biaxially oriented polyester sheeting (polyethylene terephthalate) in place of polystyrene sheeting. After corona activation of the polyester surfaces about 3.0 lbs. polyethylene per 1,000 sq. ft. is then extruded on each surface. Activation of one polyethylene surface is followed by coating of a gelatin-silver halide emulsion layer and the other activated polyethylene surface is coated first with the gelatin layer, then the silica-containing antistatic layer. The surface resistivity of the element is about 9.0 log ohms. The sheet has no visible curl.

EXAMPLE 4

The process of example 2 is carried out except using polyethylene terephthalate sheeting and coating the antistat layer over the gelatin layer from the following composition:

| | Parts by Weight |
| --- | --- |
| Silica | 0.3 |
| Sodium cellulose sulfate* | 5.0 |
| Triton X200 | 0.2 |
| Water | 94.5 |

*containing approximately 2.5 sulfate units per anhydroglucose unit (sold as such by the Kelco Chemical Co.). Other water-soluble sodium cellulose sulfates known in the art can also be used.

The invention has been described in detail with particular reference to preferred embodiments thereof, but it will be understood that variations and modifications can be effected within the spirit and scope of the invention.

We claim:

1. A process for preparing a photographic support, comprising
   activating each surface of an oriented polystyrene or linear polyester film with corona discharge,
   extruding a layer of polyolefin on each activated surface,
   coating a gelatin layer on the activated polyolefin surface, and
   activating one polyolefin surface with corona discharge,
   coating on the gelatin layer an antistatic layer containing an alkali metal salt of a polymeric carboxylic acid or an alkali metal salt of a cellulose sulfate.

2. A process for preparing a light-sensitive photographic element, comprising
   activating each surface of an oriented linear polyester film with corona discharge,
   extruding a layer of polyolefin on each activated linear polyester surface,
   activating one polyolefin surface with corona discharge,
   coating a gelatin layer on the activated polyolefin surface,
   coating on the gelating layer an antistatic layer containing an alkali metal salt of a polymeric carboxylic acid or an alkali metal salt of a cellulose sulfate,
   activating the other polyolefin surface with corona discharge, and
   coating a gelatin-silver halide emulsion layer on said other activated polyolefin surface.

3. A process for preparing a light-sensitive photographic element, comprising
   activating each surface of an oriented polystrene film with corona discharge,
   extruding a layer of polyethylene on each activated polystyrene surface,
   activating one polyethylene surface with corona discharge,
   coating a gelatin layer on the activated polyethylene surface,
   coating on the gelatin layer an antistatic layer containing a mixture of an alkali metal salt of a polymeric carboxylic acid and silica about 1 to 10 micron particle size,
   activating the other polyethylene surface with corona discharge, and
   coating a gelatin-silver halide emulsion layer on said other activated polyethylene surface.

4. A process for preparing a light-sensitive photographic element, comprising
   activating each surface of an oriented linear polyester film with corona discharge,
   extruding a layer of polyethylene on each activated linear polyester surface,
   activating one polyethylene surface with corona discharge, coating a gelatin layer on the activated polyethylene surface, coating on the gelating layer an antistatic layer containing a mixture of an alkali metal salt of a polymeric carboxylic acid and silica about 1 to 10 micron particle size, activating the other polyethylene surface with corona discharge, and coating a gelatin-silver halide emulsion layer on said other activated polyethylene surface.

5. A process for preparing a light-sensitive photographic element, comprising activating each surface of an oriented polystyrene film with corona discharge, extruding a layer of polyolefin on each activated polystyrene surface, activating one polyolefin surface with corona discharge, coating a gelating layer on the activated polyolefin surface, coating on the gelatin layer an antistatic layer containing an alkali metal salt of a polymeric carboxylic acid or an alkali metal salt of a cellulose sulfate, activating the other polyolefin surface with corona discharge, and coating a gelatin-silver halide emulsion layer on said other activated polyolefin surface.

6. The process of claim 5, wherein the antistatic agent is an alkali metal polyacrylate.

7. The process of claim 5 wherein the antistatic agent is sodium polymethacrylic acid.

8. The process of claim 5 wherein the gelatin layer and the antistatic layer are simultaneously coated in order upon the activated polyethylene surface.

9. A support for light-sensitive photographic layers, comprising an oriented polystyrene or polyester sheet each surface of which has been activated by corona discharge, a layer of polyolefin extrusion adhered to each corona activated surface, the outer surface of one polyolefin layer having been activated by corona discharge, a gelatin layer adhered to the corona activated polyolefin surface and an antistatic layer containing an alkali metal salt of a polymeric carboxylic acid or an alkali metal salt of cellulose sulfate, adhered to the gelatin layer.

10. A light-sensitive photographic element comprising an oriented polystyrene sheet each surface of which has been activated by corona discharge, a layer of polyethylene extrusion adhered to each corona activated polystyrene surface, the outer surface of each polyethylene layer having been activated by corona discharge, a gelatin-silver halide emulsion layer adhered to one corona activated polyethylene surface, a gelatin layer adhered to the other corona activated polyethylene surface and an antistatic layer containing a mixture of an alkali metal salt of a polymeric carboxylic acid and silica about 1 to 10 micron particle size, adhered to the gelatin layer.

11. A light-sensitive photographic element comprising an oriented polystyrene sheet each surface of which has been activated by corona discharge, a layer of polyolefin extrusion adhered to each corona activated polystyrene surface, the outer surface of each polyolefin layer having been activated by corona discharge, a gelatin-silver halide emulsion layer adhered to one corona activated polyolefin surface, a gelatin layer adhered to the other corona activated polyolefin surface and an antistatic layer containing an alkali metal salt of a polymeric carboxylic acid or an alkali metal salt of polymeric carboxylic acid or an alkali metal salt of cellulose sulfate, adhered to the gelatin layer.

12. The element of claim 11 wherein the antistatic agent is an alkali metal polyacrylate.

13. The element of claim 11 wherein the antistatic agent is sodium polymethacrylic acid.

14. A light-sensitive photographic element comprising an oriented linear polyester sheet each surface of which has been activated by corona discharge, a layer of polyolefin extrusion adhered to each corona activated linear polyester surface, the outer surface of each polyolefin layer having been activated by corona discharge, a gelatin-silver halide emulsion layer adhered to one corona activated polyolefin surface, a gelatin layer adhered to the other corona activated polyolefin surface and an antistatic layer containing an alkali metal salt of a polymeric carboxylic acid or an alkali metal salt of cellulose sulfate, adhered to the gelatin layer.

15. The element of claim 14 wherein the antistatic agent is an alkali metal polyacrylate.

16. The element of claim 14 wherein the antistatic agent is sodium polymethacrylic acid.

* * * * *